June 7, 1955
J. SEVERIN
2,709,846
FLYING SAW
Filed March 21, 1950
3 Sheets-Sheet 3
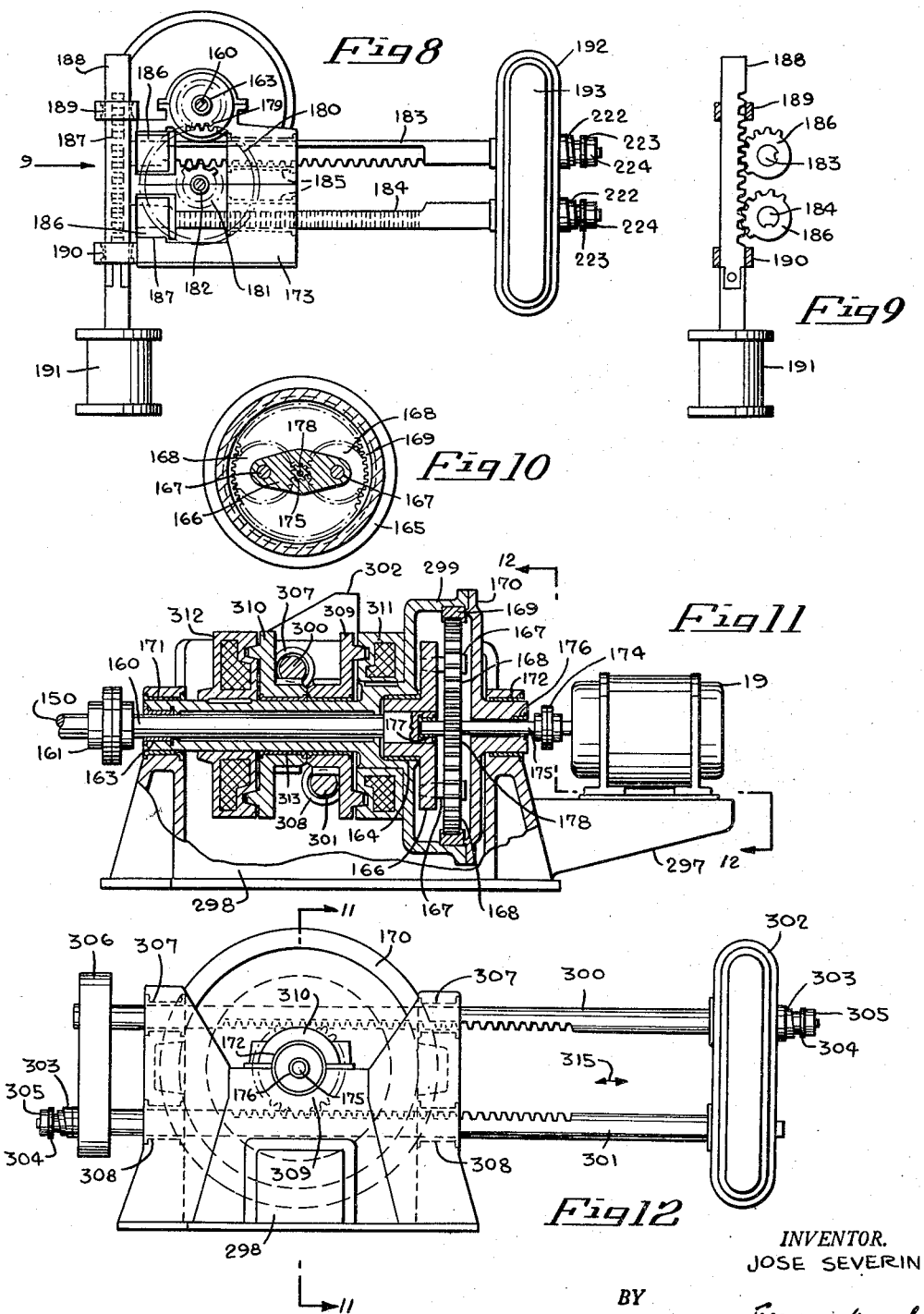
INVENTOR.
JOSE SEVERIN
BY
HIS AGENTS

United States Patent Office 2,709,846
Patented June 7, 1955

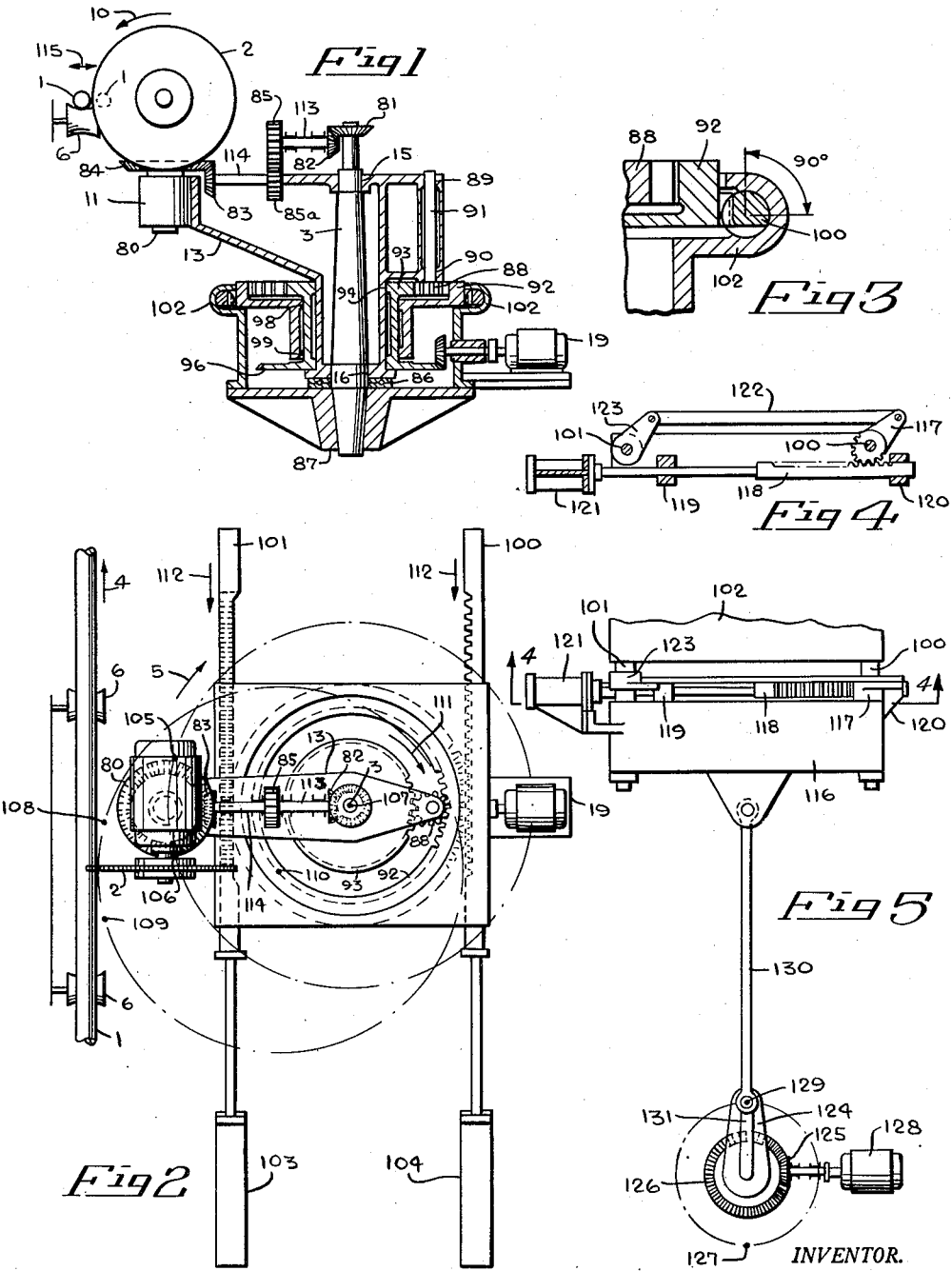

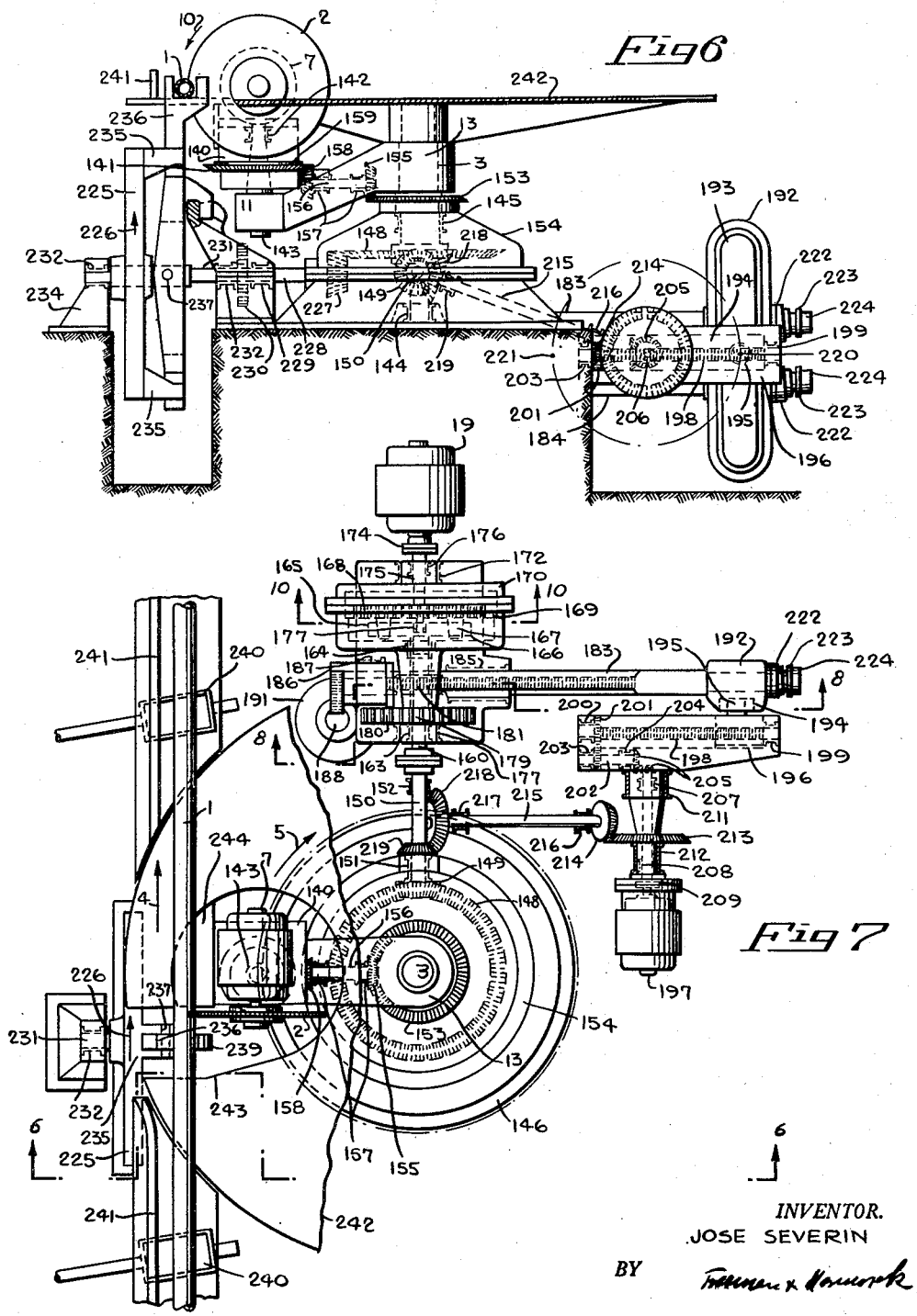

2,709,846

FLYING SAW

Jose Severin, Duisburg, Germany, assignor to Friedrich Kocks G. m. b. H., Dusseldorf, Germany Application March 21, 1950, Serial No. 150,857

Claims priority, application Germany April 5, 1949

2 Claims. (Cl. 29—69)

This invention relates generally to apparatus for severing moving stock, and more particularly relates to a flying saw for severing pipes, tubes, rods and the like while they are being advanced from a rolling mill.

It is conventional practice to mount the saw blade, the driving motor therefor and the drive transmission gear of a flying saw on a reciprocally slidable carriage. In order to sever or cut the rolling stock as it issues from the rolling mill, the saw carriage is displaced rectilinearly in the direction of movement of the stock until it has reached the velocity of the stock. At this instant the severing or cutting of the stock is effected by a lowering of the saw blade. The carriage is then returned to its initial position and is then ready for a repetition of the above cycle. Since the force needed for moving the carriage must be increased in proportion to the square of its velocity, and the carriage represents a considerable weight, the force required to move the carriage at a speed of about 5 feet per second is so great as to render such a flying saw construction disadvantageous. Furthermore, it is practically impossible to sever rolling stock having velocities much in excess of five feet per second with this prior art flying saw.

It is, accordingly, an object of the present invention to provide a novel flying saw for severing hot rolling mill stock such as pipes, tubes, rods or the like and which may satisfactorily be operated at much higher speeds than heretofore by revolving the saw and its support instead of moving it rectilinearly.

It is another object of the invention to provide a flying saw of the type referred to which produces a clean, unobjectional cut of rolling stock such as tubes, rods, pipes, rails and the like moving at a considerable speed without damage to the stock.

It is a further object of the invention to provide a flying saw which will sever sections from stock continuously advancing from a rolling mill, the sections having lengths which may be varied at will in accordance with various requirements.

The flying saw of the present invention is based on a radical departure from the conventional method of displacing the flying saw and its drive mechanism including the supporting carriage in a rectilinear path. In accordance with the present invention the flying saw and its support are revolved about a center pivot. This circular movement of the saw about its pivot is effected in synchronism with the movement of the rolling stock as it issues from the rolling mill.

The cut is performed during each cycle of rotation of the saw at the instant when the saw arrives at the point of nearest approach to the stock. The cut is effected by displacing the saw blade with respect to the stock, for example by a vertical or horizontal displacement of the stock towards the saw blade. The length of the severed stock sections will accordingly correspond to the length of the circular path of the saw and its angular speed.

Frequently it is desired to cut stock sections of varying length depending on different requirements. This may readily be effected in accordance with the present invention by varying the angular velocity of the saw during each revolution about its pivot. While the saw is cutting the advancing stock, the angular velocity of the saw blade must match the speed with which the stock advances. During the remainder of the cycle of operation of the saw blade, its angular speed may be advanced or retarded to control the time required for the saw blade to return to its cutting position. This may preferably be effected by a differential gear mechanism comprising gear means and reciprocably movable gear engaging members. Each of the members is able to engage the gear means alternatively to vary the speed of the saw blade with respect to the advance speed of the stock prior to and after the cutting period. This permits to vary the length of the stock sections being cut in accordance with various requirements.

Several preferred embodiments of the invention are illustrated by way of example, in the accompanying drawings, where identical elements are designated with the same reference characters.

In the drawings:

Fig. 1 is a vertical sectional view of a flying saw embodying the present invention provided with a differential gear mechanism actuated by racks and controlled by air cylinders;

Fig. 2 is a top plan view of the saw of Fig. 1;

Fig. 3 is a vertical sectional view on enlarged scale of a constructional detail of the rack and gear device of the saw of Fig. 1;

Fig. 4 is a vertical sectional view on line 4—4 of Fig. 5, illustrating the reversing mechanism for the racks;

Fig. 5 is a top plan view of the mechanism illustrated in Fig. 4;

Fig. 6 is a diagrammatic view of a modification of the flying saw of the invention taken on line 6—6 of Fig. 7;

Fig. 7 is a top plan view of the flying saw of Fig. 6;

Fig. 8 is a vertical sectional view taken on line 8—8 of Fig. 7;

Fig. 9 is a side view of the mechanism of Fig. 8 taken in the direction of arrow 9;

Fig. 10 is a sectional view taken on line 10—10 of Fig. 7;

Fig. 11 is a vertical sectional view on line 11—11 of Fig. 12 illustrating another modification of the differential gear mechanism for the flying saw of the invention; and Fig. 12 is a side view, partly in section, of the mechanism of Fig. 11 taken on line 12—12 of Fig. 11.

Referring now to the drawings and particularly to Figs. 1 to 5, there is illustrated a flying saw including a saw blade 2. The saw blade 2 is disposed in a vertical cutting position and revolves without change of its vertical position together with its driving means about a center pivot or shaft 3. The circumferential speed of the saw 2 matches the speed with which the stock to be cut such as a rod 1 is advanced when the saw reaches its cutting position as well as shortly before and after this position has been reached. The saw blade revolves in a horizontal plane.

The rod 1 is severed by displacing it in a horizontal plane towards the saw as illustrated in Fig. 1 by the solid and dotted position of the stock. The displacement of the rod is indicated by the arrow 115. The length of the sections cut from the stock is varied by accelerating or retarding the speed of revolution of the saw during each cycle of revolution and outside of the cutting portion of the cycle.

The saw blade 2 is mounted directly on the shaft of motor 7. Both motor 7 and saw blade 2 are carried on a suitable support having a pivot 80 which is located in a head 11. As pointed out hereinabove the saw blade 2 is maintained in a vertical operating position at all times during its revolution about pivot 3. To this end bevel gear 81 is secured to the top portion of fixed pivot 3 and meshes with bevel gear 82 secured to shaft 113 which carries a spur gear 85 engaging spur gear 85a on shaft 114 which in turn carries bevel gear 83 meshing with bevel gear 84 on head 11. Head 11 is rigidly connected to revolving arm 13 which rotates in bearings 15, 16 about pivot 3. Accordingly, when arm 13 is rotated about pivot 3, the gear train 81, 82, 85, 85a, 83, 84 will rotate head 11 so that the saw 2 remains at right angles to the advancing stock 1.

The combined weight of rotatable arm 13 and of the saw mechanism is taken up by roller bearing 86 and support 87 which is mounted on a base, not shown.

A shaft 91 and a spur gear 88 secured thereto are rotatably supported by bearings 89, 90 in arm 13. Spur gear 88 engages a ring gear 92 having internal teeth and a gear 93. Gear 93 rotates about the lower cylindrical portion of arm 13 and is freely rotatable with respect to the arm 13 by virtue of bearings 94, 95. The gear 93 carries a bevelled shrouding 96 which is rotated through a bevel gear 97 driven by motor 19. Ring gear 92 is rotatable in bearings 98 and 99 about the cylindrical hub of gear 93. The ring gear is also provided with outer teeth which coact with two racks 100 and 101 as shown particularly in Fig. 2. The racks 100 and 101 are reciprocably disposed in housing 102. The racks may be moved to and fro by means of hydraulic or pneumatic cylinders 103 and 104 illustrated in Fig. 2.

As shown particularly in Fig. 3 the rack 100 has teeth along a portion of its outer circumference which are adapted to engage the outer teeth of ring gear 92. Another circumferential portion of the rack is flattened. If the rack 100 is rotated through 90°, rack 100 and ring gear 92 no longer engage and the rack may be moved at will along its longitudinal axis without causing rotating of ring gear 92. Rack 101 is constructed in the same manner as is rack 100. The two racks are displaced at an angle of 90° with respect to each other so that while one rack engages the ring gear 92, the other rack is out of engagement with the ring gear.

If it is desired to sever a section from rod 1 having a length which is equal to the circumference of a saw revolution about its center pivot 3, the racks are not moved and ring gear 92 remains stationary. In that case the saw blade revolves at a constant speed during its entire cycle of operation. The constant speed of revolution of the saw blade equals the speed with which the rolling stock is advanced. In this case gear 88 rotated by gear 93 cooperates with the inner teeth of ring gear 92 and therefore rotates arm 13 about pivot 3.

The points 105, 106 and 107 forming a triangle as shown in Fig. 2 define the angle of revolution which is passed by the pivot 80 in the head 11 during the severing operation of the stock.

As pointed out hereinbefore, the saw is always kept in a position so that a plane through the saw intersects the rolling stock at right angles. Hence each point of the projection of the saw blade 2 into a plane moves through an equally large circle. This path in plane projection is indicated for the circumferential point of saw blade 2 which is nearest to the rod 1 by a circle, and the cutting angle of the path is designated by the points 108, 109 and 110. This angle, of course, equals the cutting angle 105, 106, 107. When the saw moves through cutting angle 108, 109, 110, the peripheral speed of the saw equals the advance speed of bar 1. In accordance with the embodiment of the invention of Figs. 1 to 5 the two racks 100, 101 will therefore always remain inoperative when the saw revolves through the cutting angle.

If it is desired to vary the length of the cut rod sections, the speed of revolution of the saw outside of the cutting angle must be accelerated or retarded depending upon whether the sections should be made shorter or longer than their length obtained with a constant speed of revolution of the saw. It will be understood that when the speed of revolution of the saw is increased, the saw will return to the cutting position in a shorter time during which the rolling stock has advanced a smaller distance; hence shorter sections will be cut under such conditions. If longer sections are desired, the speed of revolution of the saw is decreased.

This may be effected by a rotation of the ring gear 92. Such a rotation of the ring gear may be initiated as soon as the cut is completed and it must be terminated before the next cut is begun. Rotation of ring gear 92 in the direction of arrow 111 and in the same direction as the direction of rotation of gear 88 increases the path of movement of gear 88 with respect to the inner teeth of ring gear 92 to an exactly predeterminable degree. Since the circumferential speed of gear 93 which drives gear 88 is constant, the rotational speed of arm 13 and therefore of the saw blade is reduced so that the saw blade reaches the point 109 of the cutting angle at a later time than if the ring gear 92 would not rotate.

If ring gear 92 is rotated in a direction opposite to that of arrow 111, the opposite conditions prevail. Coaction of ring gear 92 and of gear 88 extends over a shorter path and the saw blade reaches point 109 of the cutting angle at an earlier time, that is, the speed of revolution of the saw is increased. The lengths of the cut-off sections may be controlled by an adjustable displacement of the pistons of the air cylinders 103, 104.

Both racks 100, 101 must be actuated simultaneously either in the direction of arrow 112 or in the opposite direction. The two racks may be connected by a cross piece to insure that they move in unison.

The manner in which the racks are rotated and an alternative mechanism for advancing and retracting the racks is illustrated in Figs. 4 and 5 to which reference is now made. Preferably, retardation or acceleration of the speed of revolution of the saw blade is performed gradually. Consequently, the racks may be operated by an electrically actuated adjustable crank mechanism as shown in Fig. 5.

The racks 100, 101 are rotatably carried in cross piece 116. A crank 117 is provided with a toothed portion engageable with a rack 118. Rack 118 is slidable in bearings 119, 120 and is actuated by means of an air of hydraulic cylinder 121, the bearings being located on cross piece 116. Cylinder 121 is also supported by the cross piece. A connecting rod 122 serves to transmit the rotation of crank 117 to another crank 123 which is mounted on rack 101.

The mechanism for advancing or rotating the racks 100, 101, in unison consists of a crank 124 which is rotated by means of bevel gears 125, 126 towards a rest point 127 by motor 128. This occurs during the period while the saw revolves outside the cutting angle 108, 109, 110. While the saw passes from point 109 to point 108, the crank mechanism has reached its other rest point 129. Crank 124 is connected with cross piece 116 by a connecting rod 130. The stroke of the crank is adjustable by means of the slot 131 to control the desired length of the rod sections. The rod is moved toward the saw in a manner which will be explained hereinafter in connection with Figs. 6 and 7.

Another embodiment of the invention is shown in Figs. 6 to 10. The saw blade 2 again revolves in a horizontal plane about center pivot 3. The stock is again severed by transporting the rod 1 towards the saw when the saw has reached its proper cutting position. The saw revolves about its center pivot 3 at a speed equal to the speed which the stock is advanced during the cutting portion of the cycle. Variation of the lengths of the stock segments is obtained by accelerating or retarding the revolving speed of the saw 2 during the non-cutting portion of the cycle of rotation. This is effected by actuation of a crank-operated differential gear mechanism located between the main drive motor and the main drive shaft.

As shown particularly in Figs. 6 and 7 to which reference is now made, the saw blade 2 is directly supported on the shaft of motor 7. Motor 7 is disposed in a support 140. The support 140 is rotatable about pivot 143 by means of bearings 141, 142, the pivot 143 being secured to head 11. Head 11, in turn, is mounted on the outer end of revolving arm 13. Arm 13 has a hub portion secured to center pivot 3. The center pivot is rotatably mounted in bearings 144, 145 disposed in a housing composed of base 146 and support 147. A bevel gear 148 is secured to center pivot 3 and is rotated by bevel gear 149 secured to shaft 150 which is rotatably supported by bearings 151, 152.

The saw blade 2 is maintained in a plane perpendicular to stock 1 in the following manner. Bevel gear 153 is fixed to the upper portion of support 154. Bevel gear 155 engages bevel gear 153 during the revolution of arm 13 about center pivot 3 and rotates shaft 156 which is rotatably supported in bearings 157. Bevel gear 158 on shaft 156 is hence rotated to turn bevel gear 159 secured to the motor support 140. Accordingly, the motor support is rotated with respect to arm 13 but is maintained at the same orientation with respect to the moving stock.

The drive shaft 150 is connected to shaft 160 by a coupling 161. Shaft 160 is rotatably mounted in bearings 163, 164 which are located in housing 165. A planetary gear carrier 166 (see also Fig. 10) is fixed to the end of shaft 160 projecting into housing 165. Two pins 167, are attached to gear carrier 166 for rotatably supporting two planetary gears 168. The planetary gears engage the inner teeth of an outer ring gear 169 secured to housing 165. A cover 170 closes the open end of housing 165 forming a body with cover 170 which is rotatable in bearings 171 and 172 of housing 173.

Motor 19 drives the shaft 175 through a coupling 174 and has a speed which may be adjusted in accordance with the speed of the advance feed of rod 1. Shaft 175 is carried in bearing 176 located in cover 170 and in bearing 177 mounted in gear carrier 166. A sun gear 178 is mounted on shaft 175 and meshes with both of the planetary gears 168.

A gear 179 is fixed to the hub of housing 165 and meshes with a gear 180. Gear 180 together with gear 181 is rotatably carried by shaft 182 (see Fig. 8) in the lower portion of housing 173. Racks 183 and 184 are slidably located in guide bushings 185 and in bores of two hubs 186 both being disposed in housing 173. The racks are disposed above and beneath gear 181 and adapted to engage therewith. Hubs 186 are provided with teeth over a portion of their circumference and are rotatably mounted in bearings 187 in housing 173. A rack 188, Fig. 9, is vertically displaceable relative to the racks 183, 184 in bearings 189, 190 of housing 173. Rack 188 meshes with the teeth of hubs 186, and is moved upwards and downwards by air cylinder 191. The up and down movement of rack 188 is effected each time the saw blade 2 reaches the center point of the cutting section of the revolving saw. The movement of air cylinder 191 is effected in any suitable manner, for example, by a solenoid which may be controlled by the rotation of arm 13.

The two racks 183, 184 have the same construction as racks 100, 101 shown in Fig. 3. Accordingly, they are provided with teeth over a portion of their circumference and are flattened at an angle of 90° from the teeth. The two tubular hubs 186 and hence the two racks 183, 184 have such an angular position with respect to each other that only one of the racks meshes with gear 181. The racks 183, 184 are connected by a cross member 192 and rotatably disposed in bores therein. Cross member 192 is provided with an inner cavity 193 housing a slide member 194 having a bore. A crank pin 195 rotatable in this bore is displaceable disposed in crank 196.

Crank pin 195 is displaced by motor 197 by means of a threaded spindle 198 rotatable in bearings 199, 200 disposed in crank 196, two gears 201, 201, shaft 202 rotatable in bearings 203, 204, a pair of bevel gears 205, 205, shaft 206 rotatable in bearings 207, 208 and a coupling 209. Shaft 206 is disposed within the axle of crank 196 and motor 197 is directly connected with the shaft 206 through coupling 205. The axle of crank 196 is carried in bearings 211, 212 located in a housing not illustrated. Bevel gear 213 is fixed to the axle of crank 196. Bevel gear 213 is driven by bevel gear 214 fixed to shaft 125. Bearing 216 is located in a housing, not shown, which accommodates the crank axis and bearing 217 located in base 146. Bevel gear 218 on shaft 215 is rotated by bevel gear 219 secured to the main drive shaft 150. The transmission ratio of the two pairs of bevel gears 213, 214 and 218, 219 is such that during one revolution of arm 13 about its pivot 3, the crank 196 makes a half revolution from rest point 220 to rest point 221 of Fig. 6 and vice versa.

Crank 196 which actuates the two racks 183, 184 is constantly moved whereas the equivalent crank 124 of Fig. 5 is stationary while the saw blade is revolved through its cutting sector. During the time the gear 181 changes engagement from one rack to the other a very small counter movement of the two racks occurs. This movement is counteracted by springs 222 shown particularly in Figs. 6 to 8 disposed between cross member 192 and discs 223 located on the racks 183, 184 and secured thereto by screws 224.

The bar 1 is advanced in a horizontal plane towards the saw blade in a manner illustrated particularly in Figs. 6 and 7. A disc wheel 225 is rotated in the direction of arrow 226 by bevel gear 148 engaging bevel gear 227 on shaft 228 carried in bearings 229. A pair of spur gears 230 are fixed to shafts 228 and 231, the latter being mounted in bearings 232. Shaft 231 supports disc wheel 225. One bearing 232 for shaft 231 is located in support 233 and the other bearing 232 is in support 234. Projections 235 on disc wheel 225 guide an advance lever 236 pivotally supported on pin 237. The lever 236 has a bifurcated upper end into which the stock 1 enters during the swinging movement of the lever. A curved cam track 238 provided on support 233 cooperates with a recessed cam follower 239 of lever 236 and swings the same and the stock 1 towards the saw and away therefrom.

The rolling stock 1 moves over rollers 240 which are inclined relative to the direction of movement of the stock in order to make sure that the stock keeps in contact with the guide ledge 241 of the roller track.

A horizontal circular disc 242 is secured to pivot 3 and extends into a recess of the roller track. The disc has a cut-out 243 composed of a straight portion and a circular portion. The bifurcated end of the lever 236 is moved into the straight recess portion and lowered from the plane of the latter shortly before, during and after the cutting operation to guide the rod 1 during its movement towards the saw and to return the rod again. The circular portion of the cut-out 243 provides clearance for the relative rotation of the saw blade and motor 7. Next to motor 7 a sector-shaped plate 244 is provided and is located in the same plane as in disc 242 and carries the section of the rod to be cut. After the cut has been performed, the disc 242 closes the recess in the roller track thereby providing a flat support for the severed rolling stock.

Referring now to Figs. 11 and 12 there is ilustrated a modified differential gear drive. Instead of connecting and disconnecting the racks with one of the two adjacent aides of one gear 181 as shown in Fig. 8, the two racks remain in cooperation with a separate gear for each rack. Each rack and gear is alternately connected or disconnected electrically with the housing of the differential gear drive by means of two electro-magnetic couplings.

Motor 19 drives shaft 175 through coupling 174. Shaft 175 is rotatably mounted in bearings 176 and 177. Bearing 176 is located in the hub portion of the cover 170. Bearing 177 is disposed in an enlarged portion of the drive shaft 160. Sun gear 178 is mounted on shaft 175 and meshes with two planetary gears 168 both meshing with the inner teeth of ring gear 169. Planetary gear carrier 166 is fixed on the enlarged portion of shaft 160. The hub of the gear carrier 166 is rotatably carried in bearing 164 in a bore of housing 299. The ring gear 169 is fixed to the rim of housing 299. The drive shaft 160 is rotatably carried in bearing 163 disposed in a bore of a sleeve portion of housing 299. Cover 170 and housing 299 are screwed together thus forming a unitary body rotatably mounted at one end in bearing 172 and at the other end in bearing 171, both bearings 171, 172 being mounted in a base 298. Coupling 161 connects drive shafts 160 and 150 to transmit power to the arm 13 which is thus revolved about its pivot in the manner previously explained.

The racks 300 and 301 have a round cross-section throughout their length and are provided with teeth along portions of their length as illustrated in Fig. 12. Racks 300 and 301 are connected by cross members 302 and 306. One end of rack 300 is fixed to cross member 306 and its opposite end is slidably mounted in member 302. Similarly, one end of rack 301 is fixed to cross member 302 while its opposite end is slidably mounted in member 306. Springs 303 press outwardly against collars 304 secured to the outer ends of racks 300, 301. Hence rack 300 is slidable in cross member 302 and rack 301 is slidable in cross member 306.

Rack 300 meshes with a gear 310 and rack 301 with a gear 309. Gears 309, 310 are integral with the hubs of discs which act as in coupling member of two electromagnetic couplings 311 and 312. If no electric current flows through either of the electro-magnetic couplings 311, 312, the gears 309 and 310 will rotate idly on the sleeve portion of the housing 299 about their bearings 314, 313, if the racks 300 and 301 reciprocate in the direction of arrows 315. By causing electric current to flow in one of the couplings 311 or 312, the discs of the gears 309 or 310 will be engaged with their mating coupling members through magnetic attraction and since the couplings 311 and 312 are fixedly mounted on the hub of housing 299, any movement of either rack 300 or 301 will rotate the housing 299 thereby increasing or decreasing (as the case may be) the angular velocity of the arm 13 about its center pivot 3.

The racks 300 and 301 may be reciprocated in the same manner described in connection with Figs. 6 and 7. The racks 300 and 301 are slidably mounted in bushings 307 and 308 mounted in base 298.

Preferably, the racks are controlled in such a manner that the couplings 311, 312 are engaged shortly before the arm 13 reaches the cutting position and the previously engaged other coupling is disconnected when the arm has passed this position. This is to ensure that both couplings are never disconnected simultaneously which would impede the accuracy of the lengths of the stock to be severed. The very small longitudinal displacement occurring between the two racks 300 and 301 during the interval of time of a fraction of a second when both couplings are connected will be taken care of by the action of the springs 303 after the disengagement of one coupling.

Since certain changes may be made in the above invention and different embodiments of the invention could be made without departing from the scope thereof, it is intended that all matter contained in the above description or shown in the accompanying drawings shall be interpreted as illustrative and not in a limiting sense.

Having thus described the invention, what I claim as new and desire to be secured by Letters Patent, is as follows:

1. In a flying saw a base, a vertical pivot mounted on said base, a circular vertically positioned saw blade, an arm of constant length mounted on said pivot and connecting the same with said saw blade, means to feed the stock to be cut towards said saw blade, means to revolve the latter during the cutting period in a horizontal plane and at a speed equalling the feeding speed of the stock and means associated with said revolving means continuously operating and alternatingly oppositely actuable to vary the speed of the saw blade relatively to the feeding speed of the stock prior to and after the cutting period when the length of the stock sections to be cut differs from the length predicated by the constant length of said arm.

2. In a flying saw a base, a vertical pivot mounted on said base, a circular vertically positioned saw blade, an arm of constant length mounted on said pivot and connecting the same with said saw blade, means to feed the stock to be cut towards said saw blade, means to revolve the latter during the cutting period in a horizontal plane and at a speed equalling the feeding speed of the stock, and means associated with said revolving means and including a differential gear mechanism comprising gear means and reciprocably movable gear engaging members, each member being operable to engage said gear means alternatively to vary the speed of the saw blade relatively to the feeding speed of the stock prior to and after the cutting period when the length of the stock sections to be cut differs from the length predicated by the constant length of said arm.

References Cited in the file of this patent

UNITED STATES PATENTS

| | | |
|---|---|---|
| 1,606,308 | Lund | Nov. 9, 1926 |
| 1,817,996 | Maltby | Aug. 11, 1931 |
| 2,332,013 | Rudert et al. | Oct. 19, 1943 |